United States Patent
Pavangat et al.

[11] Patent Number: 5,878,860
[45] Date of Patent: Mar. 9, 1999

[54] PLATE AND FACING ASSEMBLY

[75] Inventors: Nirmal Pavangat; Abdul-Hafiz Afaneh, both of Sterling Heights; Kenneth C. Yuergens, Farmington Hills, all of Mich.; Yih-Fang Chen, Lisle, Ill.

[73] Assignee: Borg-Warner Automotive, Inc., Sterling Heights, Mich.

[21] Appl. No.: 847,959

[22] Filed: Apr. 22, 1997

[51] Int. Cl.$^6$ .............................. F16D 13/64; F16D 13/72
[52] U.S. Cl. .................................. 192/107 R; 192/70.12; 192/70.14; 192/113.36
[58] Field of Search .............................. 192/70.12, 70.14, 192/107 R, 113.36

[56] References Cited

U.S. PATENT DOCUMENTS

| | | |
|---|---|---|
| 3,094,194 | 6/1963 | Kershner . |
| 3,198,295 | 8/1965 | Fangman et al. . |
| 3,557,923 | 1/1971 | Nickell et al. . |
| 3,964,586 | 6/1976 | Barrett et al. . |
| 4,674,616 | 6/1987 | Mannino, Jr. . |
| 4,967,893 | 11/1990 | Vogele . |
| 4,995,500 | 2/1991 | Payvar ................................ 192/107 R |
| 5,176,236 | 1/1993 | Ghidorzi et al. . |
| 5,332,075 | 7/1994 | Quigley et al. . |
| 5,460,255 | 10/1995 | Quigley . |
| 5,474,161 | 12/1995 | Eaton, III et al. . |
| 5,480,012 | 1/1996 | Polubinski . |
| 5,492,202 | 2/1996 | Drotar et al. . |
| 5,515,955 | 5/1996 | Victoria et al. . |
| 5,566,802 | 10/1996 | Kirkwood . |
| 5,669,474 | 9/1997 | Dehrmann et al. ............ 192/113.36 X |
| 5,671,835 | 9/1997 | Tanaka et al. . |
| 5,738,198 | 4/1998 | Walth et al. ........................ 192/113.36 |

FOREIGN PATENT DOCUMENTS

| | | |
|---|---|---|
| 0 447 019 A3 | 9/1991 | European Pat. Off. . |
| 0 625 647 A1 | 11/1994 | European Pat. Off. . |
| 2 291 410 | 6/1976 | France . |
| 4420959 | 1/1995 | Germany ........................ 192/113.36 |
| 195 12 934 A1 | 10/1996 | Germany . |
| 2 285 851 | 7/1995 | United Kingdom . |
| 2 316 153 | 2/1998 | United Kingdom . |

*Primary Examiner*—Richard M. Lorence
*Attorney, Agent, or Firm*—Emch, Schaffer, Schaub & Porcello LPA; Greg Dziegielewski

[57] ABSTRACT

A plate and facing assembly (10), including a plate (12) and a facing (14) mounted on the plate. The facing (14) defines a substantially circular outer groove (20) and a substantially circular inner groove (22) spaced from the outer groove. The facing (14) defines a waved groove (24) between the outer and inner grooves (20, 22). The outer, inner and waved grooves (20, 22, 24) are interconnected by a plurality of flow grooves (28, 30, 32) defined by the facing (14). The grooves (20, 22, 24) interact to channel the flow of fluid.

10 Claims, 7 Drawing Sheets

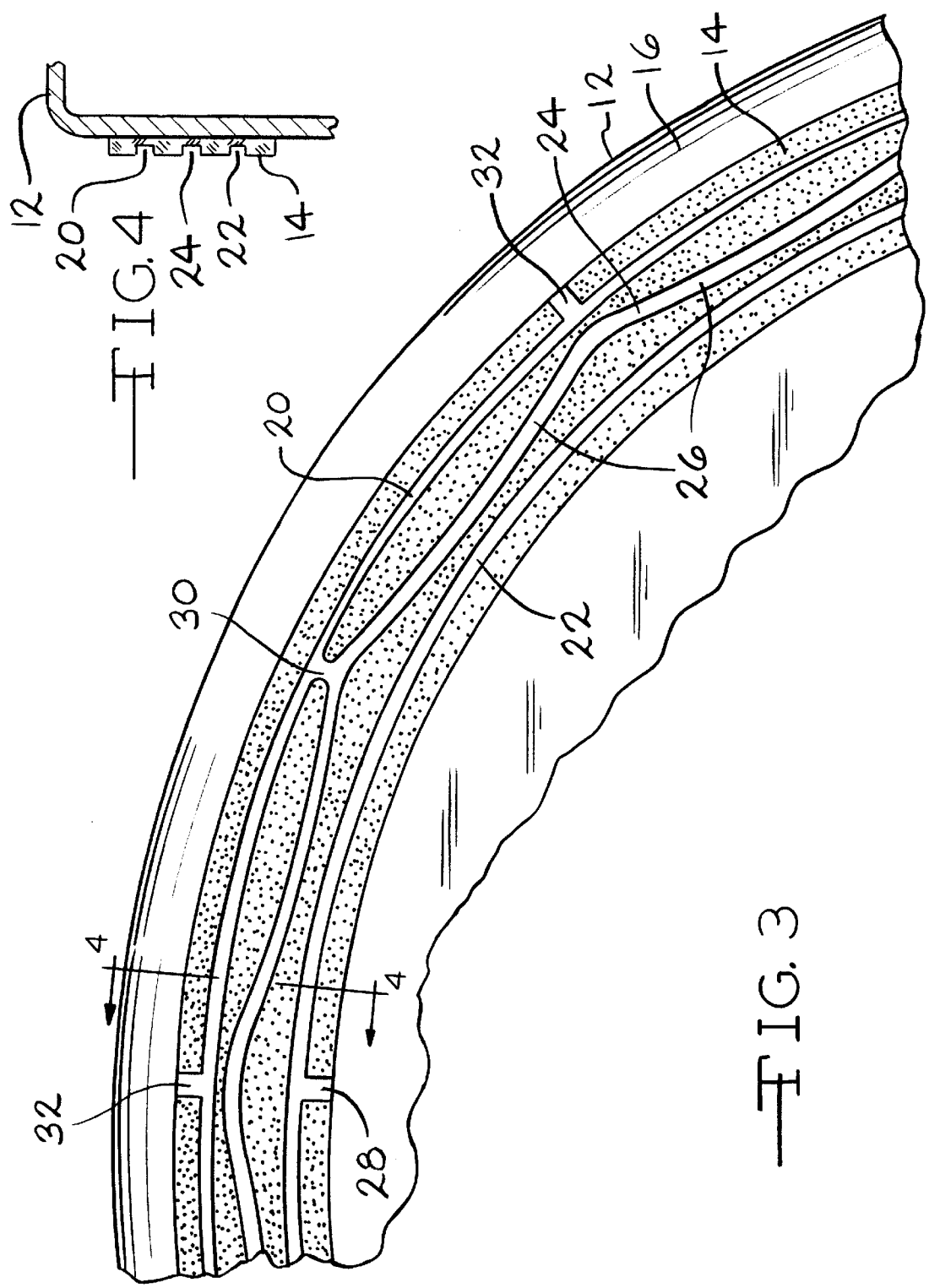

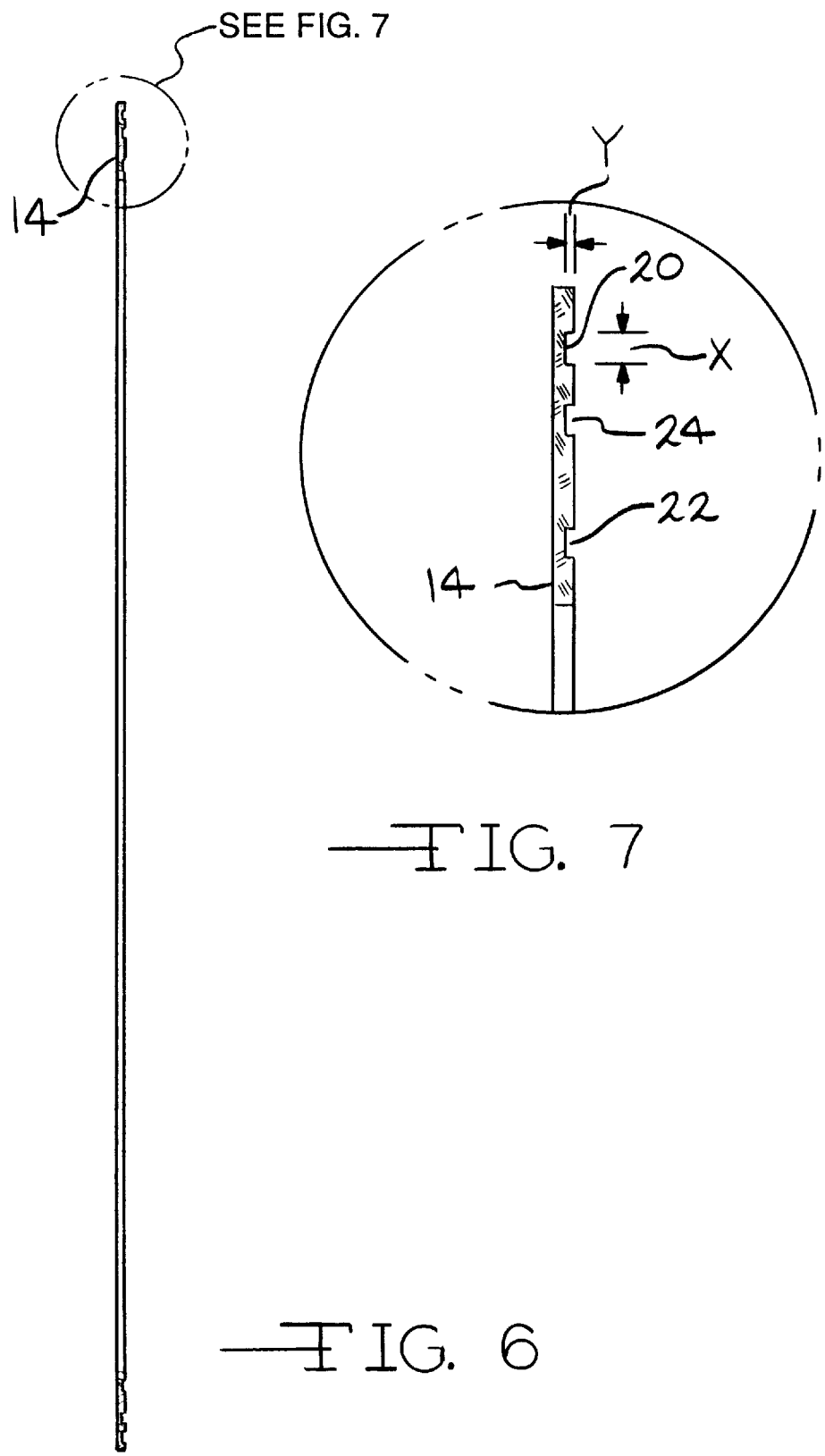

PLATE AND FACING ASSEMBLY

BACKGROUND OF THE INVENTION

The present invention relates generally to a plate and facing assembly. More specifically, the invention is directed to a clutch plate and friction material facing assembly in which the friction material facing defines a plurality of grooves for fluid flow.

Plate and facing assemblies are known in the art. These types of assemblies usually include facings that define spaced concentric circular grooves. The grooves provide channels for the flow of, for example, automatic transmission fluid (ATF). It has been found that these prior art assemblies wear quickly and often produce shudder during use.

There is a need for a plate and facing assembly that is durable and shudder resistant. The present invention satisfies this need.

SUMMARY OF THE INVENTION

The present invention is directed to a plate and facing assembly, including a plate and a facing. The facing is mounted on the plate. The facing defines a substantially circular outer groove and a substantially circular inner groove spaced from the outer groove. The facing defines a waved groove between the outer and inner grooves. The outer, inner and waved grooves are inner connected by a plurality of flow grooves.

In another embodiment, the facing defines a plurality of spaced waved grooves. Each of the waved grooves includes an inlet groove and an outlet groove.

It is the primary object of the present invention to provide a plate and facing assembly that is durable.

It is an important object of the present invention to provide a plate and facing assembly that is shudder resistant.

Other objects and advantages of the present invention will become apparent to those skilled in the art upon a review of the following detailed description of the preferred embodiments and the accompanying drawings.

BRIEF DESCRIPTION OF THE DRAWINGS

FIG. 3 is a detailed view of the facing according to the present invention;

FIG. 4 is a cross-sectional view taken along line 4—4 of FIG. 3;

FIG. 6 is a cross-sectional view taken through the center of a facing according to the present invention;

FIG. 7 is a detailed view of the facing as shown in FIG. 6;

DETAILED DESCRIPTION OF THE PREFERRED EMBODIMENTS

Figure 1:
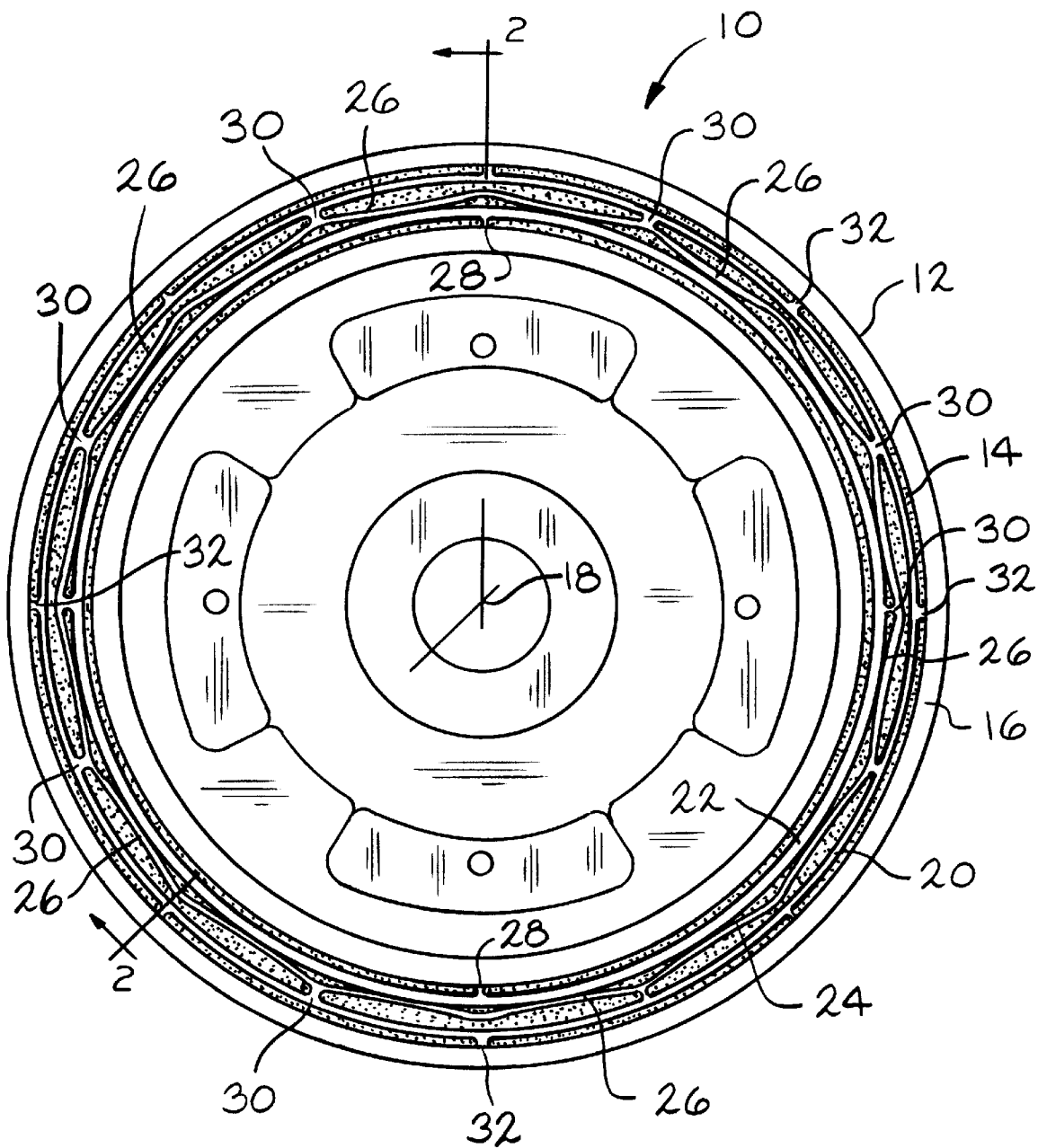
FIG. 1 is a front view of a plate and facing assembly according to the present invention.

The preferred embodiments and best mode of the present invention will now be described in detail with reference being made to the drawings. The plate and facing assembly of the present invention is indicated generally in the drawings by the reference number "10". The assembly 10 includes a plate 12 and a facing 14.

Figure 2:
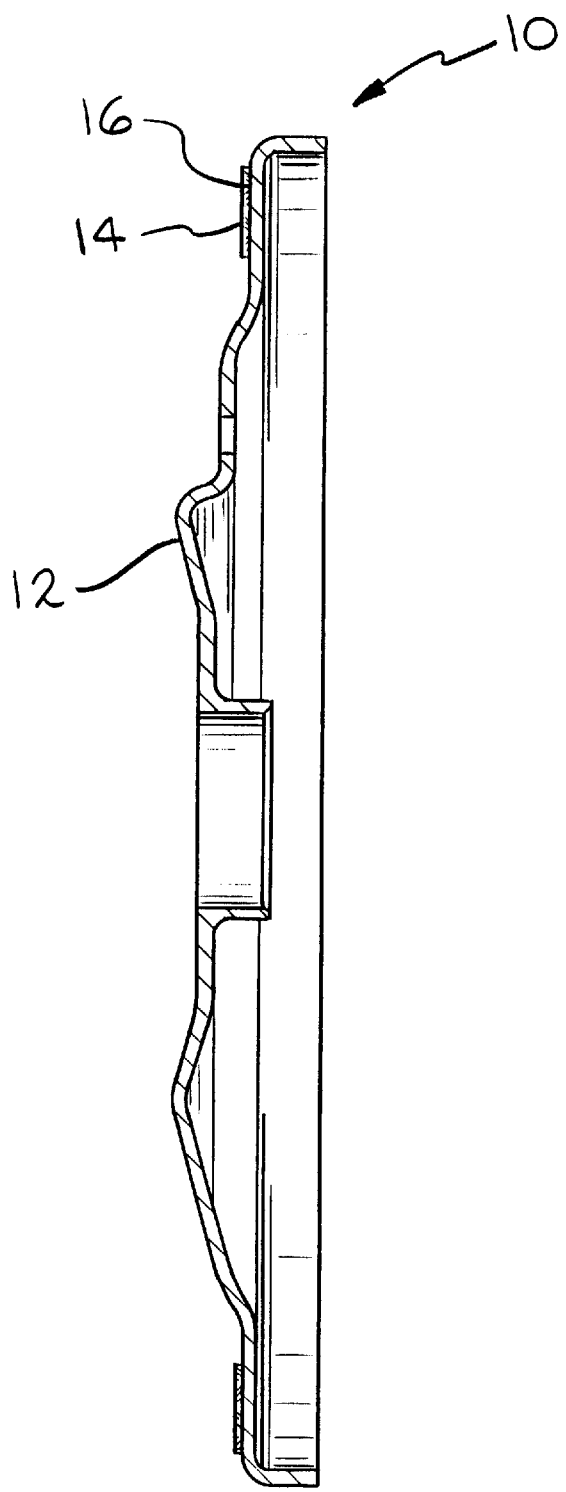
FIG. 2 is a cross-sectional view taken along line 2—2 of FIG. 1.

Referring to FIGS. 1 and 2, the plate 12 is an annular or circular metal core plate having at least one circumferential mounting surface 16. The plate 12 can be used for a variety of purposes. For example, the plate 12 can be an Electronically Controlled Converter Clutch (ECCC). The plate 12 can also be a "single face" or a "multi-face" slipping clutch, such as ones used in Continuously Variable Transmission (CVT) starting devices such as torque converters, fluid couplings and wet starting clutches. As shown in FIG. 1, the plate 12 includes a center 18.

Referring to FIGS. 1–4, the facing 14 is at least one substantially annular or circular friction material facing mounted on the mounting surface 16 of the plate 12. The facing 14 is comprised of a fibrous material. The fibers are, for example, tough aramid fibers that are very durable. The facing 14 can be segmented or continuous depending on the application. The facing 14 is fixedly attached to the plate 12 in a conventional manner.

Referring to FIGS. 1, 3, 4, 6 and 7, the facing 14 defines a substantially circular outer groove 20 and a substantially circular inner groove 22 spaced from the outer groove. As shown in FIG. 1, the circular outer and inner grooves 20 and 22 are concentric with their centers coinciding with the center 18 of the plate 12.

Still referring to FIGS. 1, 3, 4, 6 and 7, the facing 14 defines a waved groove 24 positioned between the outer and inner grooves 20 and 22. The waved groove 24 is comprised of a plurality of curved segments generally indicated by the reference number "26". In the present embodiment, there are thirty-two curved segments 26. As shown in FIG. 1, the curved segments 26 undulate to form a wave pattern.

Referring to FIGS. 1 and 3, the outer, inner and waved grooves 20, 22 and 24 are interconnected by a plurality of flow grooves defined by the facing 14 such as a plurality of inlet grooves 28, a plurality of interconnecting radial grooves 30 and a plurality of outlet grooves 32. The inlet grooves 28 are in communication with the inner groove 22 and the plate 12. The interconnecting radial grooves 30 are in communication with the outer, inner and waved grooves 20, 22 and 24. The outlet grooves 32 are in communication with the outer groove 20 and the plate 12. The number, position and spacing of the inlet, interconnecting radial and outlet grooves 28, 30 and 32 can be varied depending on the application of the assembly 10. In the present embodiment, there are two inlet grooves 28, ten interconnecting radial grooves 30 and eight outlet grooves 32.

Referring to FIGS. 6 and 7, each of the outer, inner and waved grooves 20, 22 and 24 has a predetermined width X and a predetermined depth Y. In the preferred embodiment, the predetermined width X is in the range from about 0.050 inch to about 0.070 inch and the predetermined depth Y is in the range from about 0.015 inch to about 0.020 inch. It should be understood that both the predetermined width X and the predetermined depth Y can be varied depending on the application of the assembly 10. The predetermined width X and the predetermined depth Y can be varied to accommodate specific application requirements such as the rate of fluid flow and the rate of heat transfer.

In has been found that the grooves 20, 22, 24, 28, 30 and 32 interact to channel fluid flow across the friction material facing 14 in order to optimize lubrication and dissipate heat during use of the assembly 10. The waved groove 24 optimizes fluid flow across the facing 14 to allow lubrication of the entire facing to provide adequate cooling of the assembly 10. This allows for a plate and facing assembly that is durable and shudder resistant.

Figure 5:
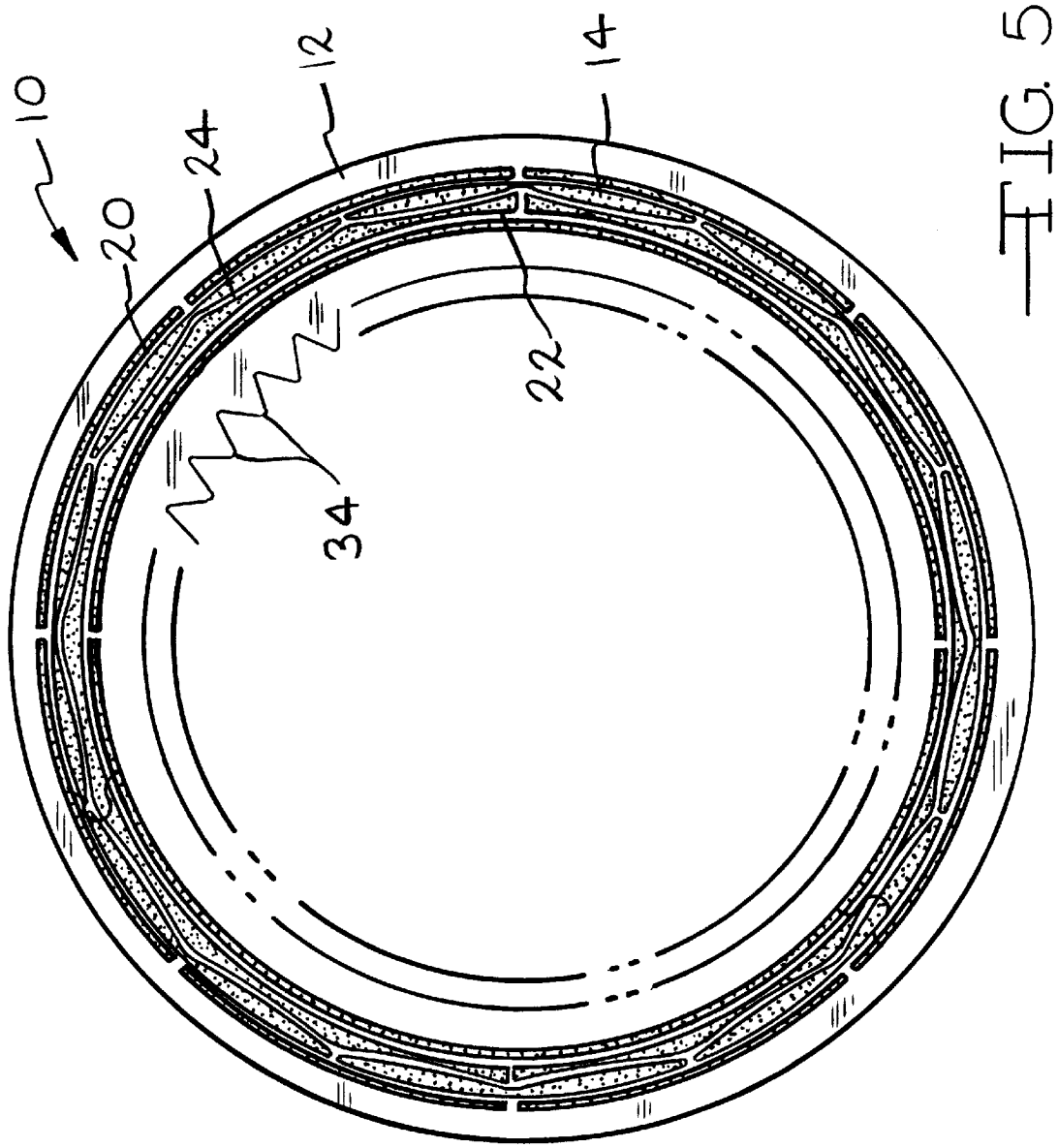
FIG. 5 is a second embodiment plate and facing assembly according to the present invention.

Referring to FIG. 5, a second embodiment assembly 10 is shown. In this embodiment, the plate 12 includes a plurality of teeth 34.

Figure 8:
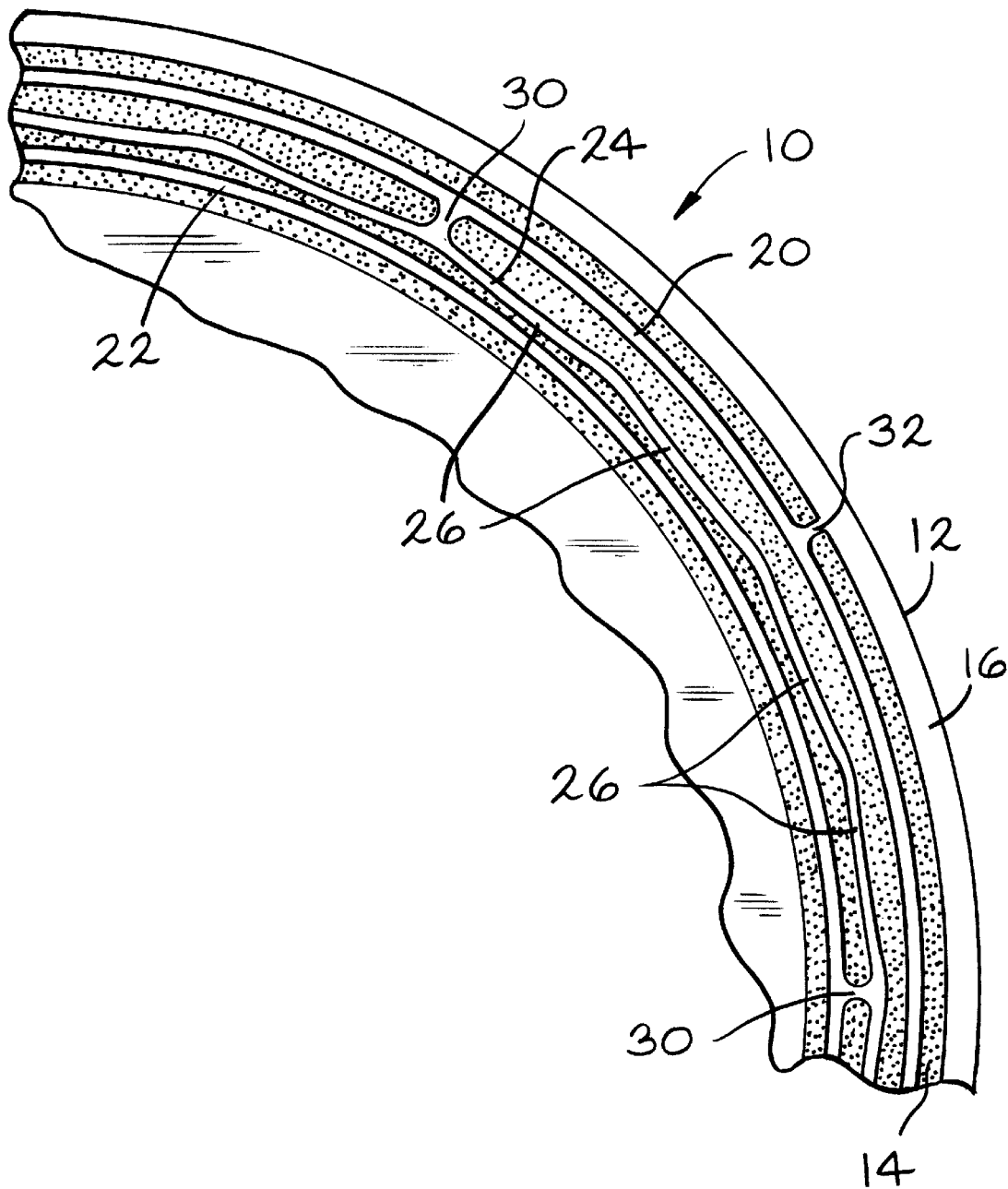
FIG. 8 is a third embodiment plate and facing assembly according to the present invention.

A third embodiment assembly 10 is shown in FIG. 8. In this embodiment, the facing 14 defines a waved groove 24 that is comprised of sixty-four curved segments 26. As shown in FIG. 8, the curved segments 26 undulate to form a wave pattern.

Figure 9:
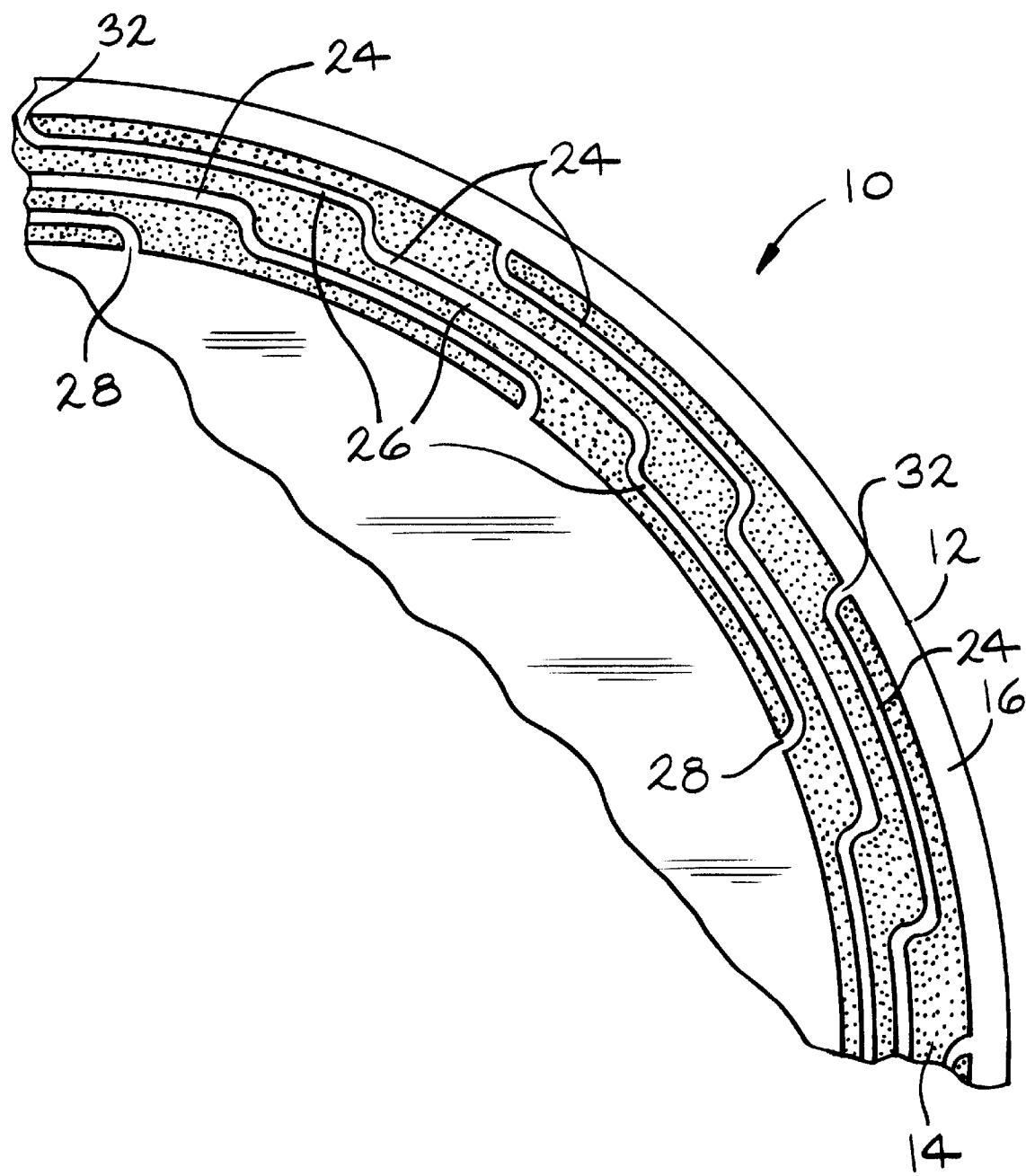
FIG. 9 is a fourth embodiment plate and facing assembly according to the present invention.

Referring to FIG. 9, a fourth embodiment assembly 10 is shown. In this embodiment, the facing 14 defines a plurality of spaced waved grooves 24. In the preferred embodiment, the facing 14 defines sixteen waved grooves 24. Each of the waved grooves 24 is comprised of a plurality of curved segments 26. In the present embodiment, each waved groove 24 is comprised of three curved segments 26. The curved segments 26 undulate to form a wave pattern. Each of the waved grooves 24 includes an inlet groove 28 and an outlet groove 32. Each of the waved grooves 24 has a predetermined width X and a predetermined depth Y as defined above for the first embodiment assembly.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A plate and facing assembly (10), comprising:
   a plate (12); and
   a facing (14) mounted on said plate (12), said facing (14) defining a substantially circular outer groove (20) and a substantially circular inner groove (22) spaced from said outer groove, said facing (14) defining a waved groove (24) between said outer and inner grooves (20,22), said outer, inner and waved grooves (20, 22, 24) being interconnected by a plurality of flow grooves (28, 30, 32) defined by said facing (14).

2. The assembly of claim 1, wherein said plate (12) is an annular metal core plate.

3. The assembly of claim 2, wherein said plate (12) is a clutch plate.

4. The assembly of claim 1, wherein said facing (14) is an annular friction facing.

5. The assembly of claim 4, wherein said facing (14) is comprised of a fibrous material.

6. The assembly of claim 1, wherein said outer and inner grooves (20, 22) are generally concentric.

7. The assembly of claim 1, wherein said plurality of flow grooves (28, 30, 32) includes a plurality of inlet grooves (28) in communication with said inner grooves and said plate (12), a plurality of interconnecting radial grooves (30) in communication with said outer, inner and waved grooves (20, 22, 24), and a plurality of outlet grooves (32) in communication with said outer groove (20) and said plate (12).

8. The assembly of claim 1, wherein each of said outer, inner and waved grooves (20, 22, 24) has a predetermined width (X) and a predetermined depth (Y).

9. The assembly of claim 8, wherein said predetermined width (X) is in the range from about 0.050 inch to about 0.070 inch and said predetermined depth (Y) is in the range from about 0.015 inch to about 0.020 inch.

10. A clutch plate and friction material facing assembly (10), comprising:
   a substantially circular clutch plate (12) having at least one circumferential mounting surface (16); and
   at least one substantially circular friction material facing (14) mounted on said mounting surface (16), said facing (14) defining a substantially circular outer groove (20) and a substantially circular inner groove (22) spaced from said outer groove, said facing (14) defining a waved groove (24) between said outer and inner grooves (20, 22), said facing (14) defining a plurality of inlet grooves (28) in communication with said inner groove (22) and said plate (12), a plurality of interconnecting radial grooves (30) in communication with said outer, inner and waved grooves (20, 22, 24), and a plurality of outlet grooves (32) in communication with said outer groove (20) and said plate (12).

* * * * *